MICROWAVE FILTER INSERTABLE WITHIN OUTER WALL OF COAXIAL LINE

Filed Oct. 29, 1962 3 Sheets-Sheet 1

INVENTOR.
ROBERT D. HALL

BY John F Lawler
ATTORNEY

MICROWAVE FILTER INSERTABLE WITHIN OUTER WALL OF COAXIAL LINE

Filed Oct. 29, 1962

3 Sheets-Sheet 2

INVENTOR.
ROBERT D. HALL

BY [signature]
ATTORNEY

Jan. 26, 1965 R. D. HALL 3,167,729

MICROWAVE FILTER INSERTABLE WITHIN OUTER WALL OF COAXIAL LINE

Filed Oct. 29, 1962 3 Sheets-Sheet 3

INVENTOR.
ROBERT D. HALL

BY John F. Lawler
ATTORNEY 3,167,729

MICROWAVE FILTER INSERTABLE WITHIN OUTER WALL OF COAXIAL LINE

Robert D. Hall, Los Altos, Calif., assignor to Sylvania Electric Products Inc., a corporation of Delaware Filed Oct. 29, 1962, Ser. No. 233,790
7 Claims. (Cl. 333—73)

This invention relates to electrical circuit components, and more particularly to a coaxial microwave filter.

Radio frequency filters comprising lumped reactance elements (capacitors and inductors) have an upper frequency limit which lies between 100 and 300 megacycles. Above this frequency range filter elements comprise lengths of open circuited and short circuited transmission lines. Thus, a system capable of transmitting frequencies up to 11 gygacycles might require two different types of circuit elements to form radio frequency filters. Also, filters using distributed elements must be of the order of a quarter wavelength at the frequencies at which they are employed and are therefore correspondingly large and heavy. Moreover, because the elements used in such filters are transmission lines whose impedance characteristics are periodic functions of frequency, many filters also have periodic electrical characteristics which make them unsuitable for many applications.

An object of this invention is the provision of compact reactive circuit elements which are rapidly stacked to form a microwave filter without the use of special tools.

Another object is the provision of a microwave filter whose impedance characteristic is non-periodic.

A further object is the provision of a filter which may be reproduced readily by photographic and printed circuit techniques.

A specific object is the provision of a coaxial microwave filter which is extremely compact and which is wholly self-contained in a coaxial transmission line.

These objects are attained by the construction of four basic geometrical elements to provide series capacitance, shunt capacitance, series inductance and shunt inductance. The elements are made by forming ultra thin conducting layers of various geometrical shapes on insulator discs. The conductor geometry determines the nature (inductive or capacitive) of the reactance, its magnitude, and the type of connection (series or shunt). More than one type of reactance may be formed on a single disc. The discs are detachably assembled by axially stacking them in physical series arrangement within a coaxial line, the electrical series connected elements being inserted between a gap in the center conductor. The outside diameter of the coaxial line is substantially unchanged.

The above and other objects of this invention will become apparent from the following description of a preferred embodiment, reference being had to the accompanying drawings in which.

Figures 13, 13A:
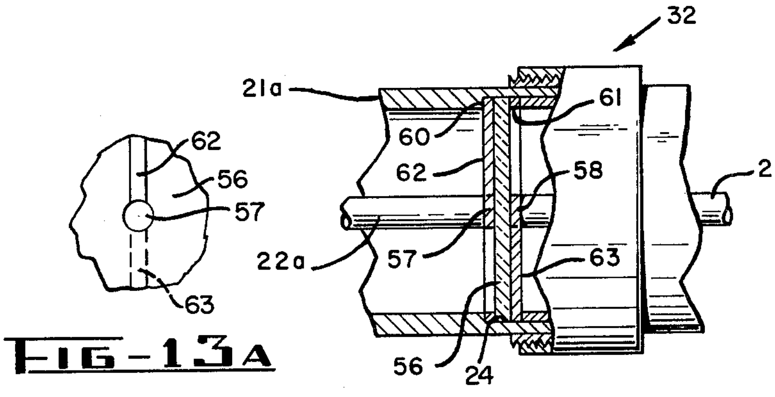
FIGURE 13 is the coaxial filter assembly of FIGURE 12 wherein the three disc reactive elements are combined on a single disc.
Figure 14:
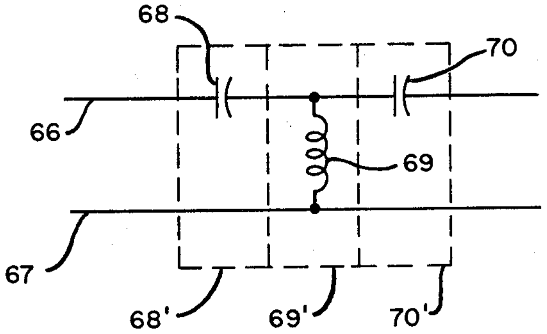
Figure 15:
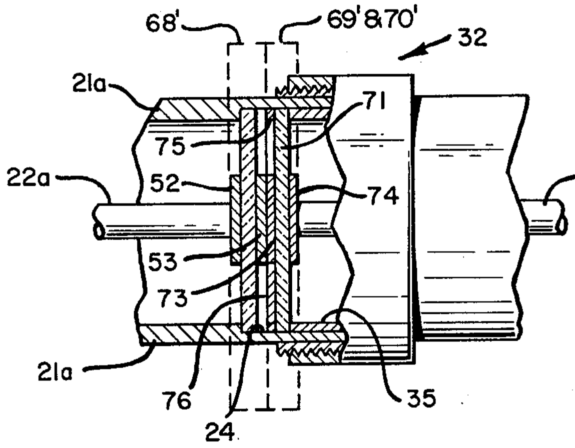

FIGURE 13*a* is a side view of a portion of the disc reactive element of FIGURE 13;

FIGURE 14 is a schematic circuit diagram of a conventional T-type high-pass filter; and FIGURE 15 is a longitudinal section of a coaxial filter comprising a combination of disc reactive elements forming the T-type high-pass filter of FIGURE 14.

Figure 1:
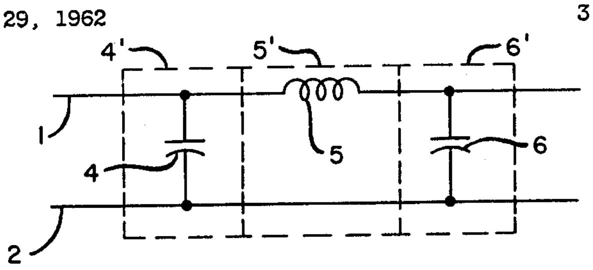
FIGURE 1 is a schematic circuit diagram of a well-known pi-type low pass filter.

Referring now to the drawings, the filter shown in FIGURE 1 comprises a pair of conductors 1 and 2 with a capacitor 4 connected in shunt between them, an inductor 5 connected in series with line 1, and another capacitor 6 connected in shunt between the conductors. This is a well-known configuration of a single section pi-type low-pass filter and is selected to illustrate one type of filter which may be constructed in accordance with my invention. The broken line frames 4', 5' and 6' indicate the corresponding filter elements in the filter constructed according to the invention and described below.

Figure 2:
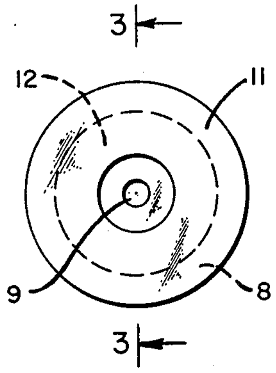
FIGURE 2 is a plan view of a shunt capacitor disc element embodying the invention.
Figure 3:
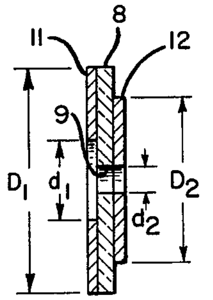
FIGURE 3 is a section taken on line 3—3 of FIGURE 2.

In accordance with my invention, capacitor 4 takes the form of an insulator disc 8, see FIGURES 2 and 3, having a center opening 9. Conducting discs 11 and 12 are formed on opposite sides of disc 8. The outer diameter $D_1$ of the larger disc 11 is the same as the outer diameter of insulator disc 8 and is designed to make contact with the outer conductor of the coaxial line in which the element is mounted. The inner diameter $d_1$ of conducting disc 11 is larger than the hole diameter $d_2$ of the insulator disc 8. The other conducting disc 12 has an outer diameter $D_2$ which lies between the inner and outer diameters of the larger disc so that both conducting discs overlap each other. The inner diameter of disc 12 is the same as the hole diameter $d_2$ of the insulator in order that electrical contact is made by disc 12 with the coaxial line inner conductor which also has a diameter of $d_2$. The capacitance of the element 4' is a function of the area of the overlap of conductive discs 11 and 12 and of the thickness of insulator disc 8.

The dimensions of the discs shown in the drawings are greatly exaggerated and out of proportion for clarity of illustrating and explaining details of construction. I have constructed a reactive element using an insulator disc 8 0.01 inch thick comprising Teflon impregnated with Fiberglas mesh and having silver plated copper conducting discs 11 and 12 that are approximately 0.0022 inch thick. The conductive pattern was photoetched on copper plated insulator discs and then silver plated. It will be understood that other than film forming techniques may be employed for this purpose. The outer diameter of the insulator disc is preferably slightly larger than the inside diameter of the outer conductor of the coaxial line to provide effective electrical contact between the parts. The means of securing this and other parts of the filter together is explained below.

Figures 4, 5:
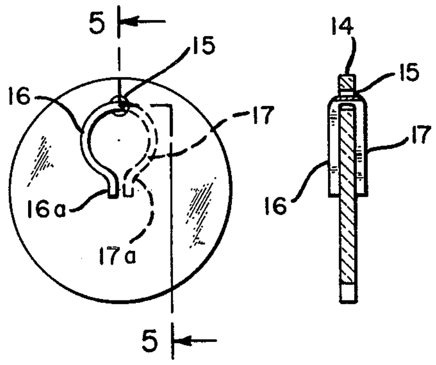
FIGURE 4 is a plan view of a series inductance disc element embodying the invention.
FIGURE 5 is a section taken on line 5—5 of FIGURE 4.

The series inductor element 5′ preferably is constructed as shown in FIGURES 4 and 5. An insulator disc 14, similar to disc 8, is fabricated with an opening 15 near but spaced from the outer edge of the disc. Two conducting strips 16 and 17 are formed on opposite sides of the disc 14 and make electrical contact through the hole 15. The ends 16*a* and 17*a* of these strips are located at approximately the center of the disc in order to make contact with the center conductor of the coaxial line in which the element is placed. The entire length and cross sectional area of the conductor comprising strips 16 and 17 determine the inductance of the element and this length may be varied to meet this requirement by curving the strips as shown. These conducting strips, like the discs 11 and 12 of the capacitor element 4′, preferably are formed by etching and plating techniques and in one embodiment had a thickness in the order of 0.002 inch and a width of approximately 0.002 inch. The diameter of disc 14 is preferably the same as the outside diameter of insulator disc 8.

Figure 6:
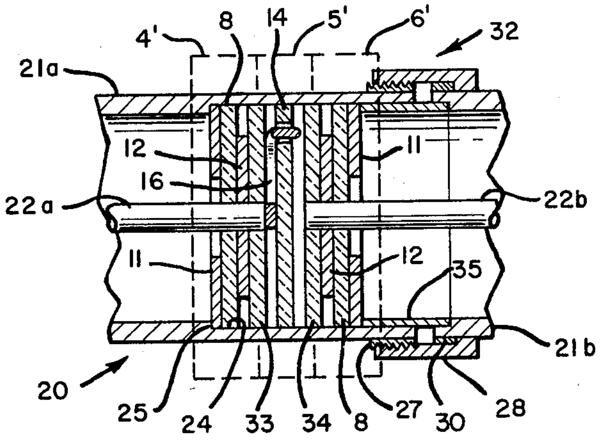
FIGURE 6 is a longitudinal section of a coaxial filter comprising the elements shown in FIGURES 2 and 4 arranged to form the pi-type low-pass filter of FIGURE 1.

The filter assembly shown in FIGURE 6 comprises a coaxial line having a two-part outer conductor 21*a* and 21*b* and a two-part inner conductor 22*a* and 22*b*. The two parts of the coaxial line are joined by means of connector assembly 32. Outer conducor 21*a* has a terminal end portion formed with a recess 24 into which the reactive disc elements are fitted. An externally threaded ring 27 is permanently secured to the end of outer conductor 21*a* for engagement by nut 28 which mechanically connects adjacent outer conductor parts 21*a* and 21*b*. An annular boss 30 on outer conductor 21*b* of the adjacent section of coaxial line provides a shoulder against which nut 28 abuts when the parts are connected. Metallic conducting ring 35 provides the coaxial line with an outer conductor having a continuous inner diameter and makes electrical contact between outer conductor parts 21*a* and 21*b*.

The filter assembly proper comprises spacers 33 and 34 which separate inductor element 5′ from capacitor elements 4′ and 6′. Center conductor 22*a* extends through the respective central openings in capacitor element 4′ and in spacer 33 and engages the inner end 16*a*, see FIGURE 4, of the inductor element conductive strip 16. Similarly, the center conductor 22*b* of the adjacent section of coaxial line extends through the respective center openings of capacitor element 6′ and of spacer 34 to make electrical contact with the adjacent end 17*a* of the inductor element conductive strip 17. The smaller conducting discs 12 of capacitor elements 4′ and 6′ snugly engage and make electrical contact with the respective center conductors 22*a* and 22*b*. The larger conducting disc 11 of capacitor element 4′ engages shoulder 25 and the inner surface of recess 24 to make electrical contact with outer conductor 21*a*. The larger conducting disc 11 of capacitor element 6′ contacts metallic ring 35 which is in electrical engagement with the outer conductors 21*a* and 21*b*. The several discs which comprise the filter are held firmly in position within the coaxial line when connector assembly 32 is tightened.

The filter assembly described above may be readily constructed by simply inserting the reactive elements within the exposed recess 24 of outer conductor 21*a* prior to the connection of the adjacent section of the coaxial line. The assembly is completed by connecting the adjacent sections of coaxial line and inserting the adjacent center conductor 22*b* into the filter by tightening nut 28 on ring 27. Conversely, the filter may be disassembled readily by reversing this procedure.

In an actual embodiment of this invention, spacer discs 33 and 34 and insulator disc 14 of inductor element 5′ were each made approximately 0.060 inch thick to reduce stray capacitance between conductive discs 12 of capacitor elements 4′ and 6′ and between conductive strips 16 and 17 of inductor element 5′. The filter assembly is less than 0.250 inch thick.

Figure 7:
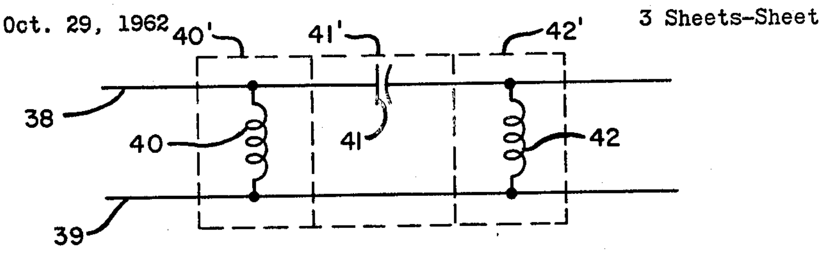
FIGURE 7 is a schematic circuit diagram of a contional pi-type high-pass filter.

Another type of filter which, by way of example, may be constructed in accordance with my invention is a pi-section high-pass filter as shown in FIGURE 7. This filter comprises lines 38 and 39, a series capacitor 41, and shunt inductor elements 40 and 42. The broken line frames separating these reactive elements identify corresponding parts of the filter assembly shown in FIGURE 12.

Figure 8:
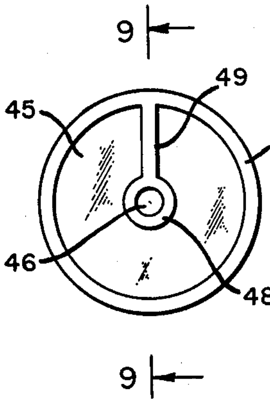
FIGURE 8 is a plan view of a shunt inductance disc element embodying the invention.
Figure 9:
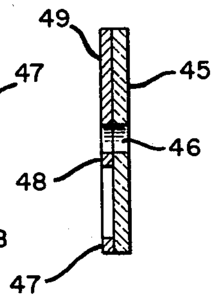
FIGURE 9 is a section taken on line 9—9 of FIGURE 8.

A shunt inductor element in accordance with my invention comprises an insulator disc 45 having a center opening 46, see FIGURES 8 and 9. Outer and inner conduction bands 47 and 48 are formed on one side of the disc. The outer band 47 preferably has the same outside diameter as insulator disc 45 which preferably is slightly larger than the inside diameter of the outer conductor of the coaxial line into which the parts are fitted as described below. Inner band 48 has an outside diameter substantially less than that of the outer band and is formed on the midportion of the same side of disc 45. The inductance of this element is provided by a conductive strip 49, shown in the drawing as a radial strip, which extends between and makes electrical contact with outer and inner bands 47 and 48, respectively. The physical dimensions of conductive strip 49 determine the value of inductance of the element and therefore this strip may be curved or otherwise shaped to have a length and cross sectional area to give the desired inductance.

Figure 10:
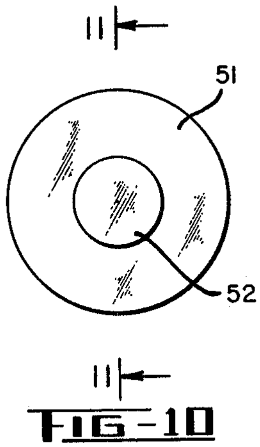
FIGURE 10 is a plan view of a series capacitor disc element embodying the invention.
Figure 11:
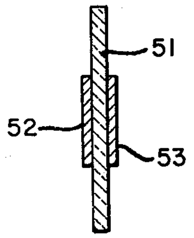
FIGURE 11 is a section taken on line 11—11 of FIGURE 10.

The series capacitor disc element 41′ is shown in FIGURES 10 and 11. This element comprises insulator disc 51 having conductor plates 52 and 53 formed, as by plating, on opposite sides of the center portions thereof. The area of plates 52 and 53 and the thickness and composition of insulator disc 51 determine the capacitance of this element and are selected to give the desired value.

Figure 12:
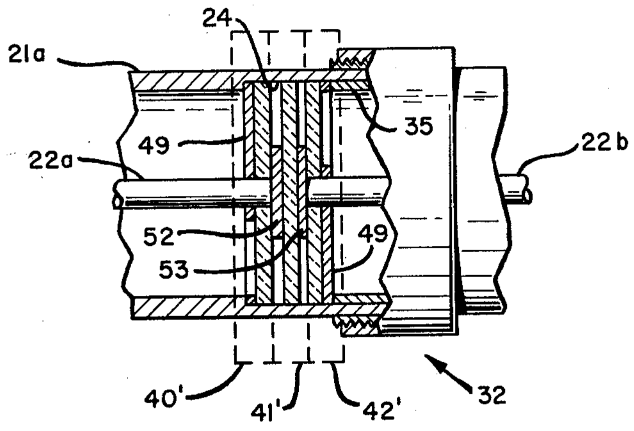
FIGURE 12 is a longitudinal section of an assembled coaxial filter comprising elements shown in FIGURES 8 and 10 arranged to form the pi-type high pass filter of FIGURE 7.

These disc elements are assembled in substantially the same manner as described above in connection with FIGURE 6 to provide the filter assembly equivalent to that of FIGURE 7. As shown in FIGURE 12, capacitor and inductor disc elements 41′, 40′ and 42′ are inserted in recess 24 of coaxial outer conductor 21*a*. Center conductor 22*a* extends through the center hole 46 of inductor element 40′ and engages plate 52 of capacitor element 41′. Center conductor 22*b* of the adjacent section of the coaxial line extends through the center hole 46 of the other inductor element 42′ and engages the opposite plate 53 of the capacitor element. The conductive strips 49 of inductor elements 40′ and 42′ extend in radially oppositely directions as shown in order to minimize any capacitance between the elements. Outer band 47 of inductor element 40′ contacts ridge 25 of recess 24 and metallic ring 35 engages the outer band 47 of inductor element 42′ to complete electrical contact between the filter and the coaxial line. The disc filter assembly is held securely by connector assembly 32 substantially as described above. The axial width of the filter proper is approximately 0.035 inch.

In order to further minimize space required for a disc filter assembly embodying this invention, more than one reactive element may be formed on a single disc. The filter assembly shown in FIGURES 13 and 13*a* is electrically equivalent to that of the embodiment of FIGURE 12 except that the three reactive elements comprising the filter are formed on a single insulator disc 56. This disc has conductive plates 57 and 58 formed on opposite sides of the midportion thereof and has outer bands 60 and 61 formed at or near the periphery on opposite sides of the disc. Oppositely extending radial conductive strips 62 and 63 on the respective sides of the insulator disc connect the respective plates and bands as shown to complete the filter assembly. This single disc filter fits into recess 24 of outer conductor 21a and outer band 60 contacts the shoulder of the recess. Center conductor 22a abuts and makes electrical contact with capacitor plate 57. The other plate 58 is engaged by the center conductor 22b of the adjacent portion of the coaxial line. The assembly is held securely by the connector assembly 32 substantially as described above.

The conductive elements comprising this filter are formed on the single disc by photoetching and plating or other thin film forming technique, and the axial width of the entire filter is approximately 0.015 inch.

Another type of filter which may be constructed in accordance with my invention is the T-section high-pass filter shown in FIGURE 14. This filter comprises lines 66 and 67, a capacitor 68 in series with line 6, an inductor 69 in shunt between lines 66 and 67 and another series capacitor 70 in series with line 66. As before, the broken line frames enclosing these reactive elements identify corresponding parts of the disc filter construction shown in FIGURE 15.

The disc assembly of FIGURE 15 is the electrical equivalent of the T-section high-pass filter of FIGURE 14. Inductor 69 and capacitor 70 of FIGURE 14 are formed on a single insulator disc 71. This disc has conductive plates 73 and 74 formed on opposite sides thereof and has an outer conductive band 75 formed adjacent to the disc periphery and on the side of the disc containing plate 73. Radial conductive strip 76 extends between and connects plate 73 and 75. The capacitor disc element 68', as shown in FIGURE 10, and combination disc elements 69' and 70' are inserted in recess 24 of outer conductor 21a. Center conductor 21a abuts and makes electrical contact with plate 52 of disc element 68'. Plate 73 on disc 71 abuts and makes electrical contact with plate 53 of disc element 68'. Band 75 on disc 71 completes the electrical connection of strip 76 between plate 73 and outer conductor 21a. Adjacent portions of inner conductor 22b contact plate 74 when the disc filter assembly is secured by connector assembly 32 substantially as described above. The axial width of this filter is approximately 0.025 inch.

By way of example, a high-pass filter of the type shown in FIGURE 15 which has been constructed and successfully tested has the following characteristics and dimensions.

| | Inch |
|---|---|
| Outer Diameter | 0.6 |
| Thickness [1] | 0.022 |

| Frequency, gc.: | Insertion loss, db |
|---|---|
| D.C. to 45. | >25 |
| 0.5 | 21.5 |
| 0.6 | 14.5 |
| 0.7 | 8.5 |
| 0.8 | 5.5 |
| 0.9 | 3.0 |
| 1.0 | 1.8 |
| 1.1 | 1.1 |
| 1.2 | 0.7 |
| 1.3–10.9 | <0.7 |

[1] The thickness of the filter does not include connector assembly 32.

Changes, modifications and improvements to the above described embodiments of my invention will occur to those skilled in the art without departing from the spirit and scope of the invention. The scope of the invention is defined by the appended claims.

What is claimed is:

1. A radio frequency filter for a coaxial line having an inner conductor and an outer conductor, including reactance means disposed completely within said outer conductor and connected in electrical series with said center conductor and in shunt between said center and outer conductors, said reactance means comprising
   - dielectric means engaging the inner surface of the outer conductor and extending transversely of the axis of the line,
   - first and second conductive patterns on said dielectric means having a predetermined capacitance, and
   - a third conductive pattern on said dielectric means having a length corresponding to a predetermined inductance, each of said patterns being electrically connected to at least one of said conductors.

2. The filter according to claim 1 with means for securing said dielectric means in fixed position within said coaxial line.

3. A radio frequency filter for a coaxial line having an outer conductor and an inner conductor severed to form a gap, said filter comprising
   - dielectric means disposed within said outer conductor,
   - a first inductor conductive pattern on said dielectric means and electrically connected in shunt between the outer conductor and the inner conductor on one side of the gap,
   - a second inductor conductive pattern on said dielectric means and connected in shunt between the outer conductor and the inner conductor on the other side of the gap, and
   - capacitor conductive patterns on said dielectric means, comprising first and second conductive patterns axially spaced apart from one another and having portions thereof in axial alignment, said first and second conductive patterns being electrically connected to said inner conductor on opposite sides, respectively, of said gap.

4. The filter according to claim 3 in which said dielectric means comprises a single disc engaging the innersurface of the outer conductor and extending transversely of the axis of the line through said gap.

5. The filter according to claim 3 in which said dielectric means comprises three axially stacked discs with an inner disc disposed between a pair of outer discs, said inner disc extending through said gap and having said capacitor conductive patterns formed thereon, each of said outer discs having a central opening through which the inner conductor extends and having one of said inductor conductive patterns formed thereon.

6. A radio frequency filter for a coaxial line having an outer conductor and an inner conductor severed to form a gap, said filter comprising
   - first and second capacitor elements disposed within said outer conductor,
     - each of said elements having a dielectric disc engaging the inner surface of the outer conductor and having conductive plates on opposite sides of said disc, said plates having portions thereof in radially overlapping relationship,
   - means for electrically connecting one of said plates on each element to the outer conductor,
   - means for electrically connecting the other plates on the first and second elements to the center conductor on opposite sides, respectively, of said gap, and
   - an inductor element comprising conductor means of predetermined length connected in series with the center conductor across said gap.

7. A radio frequency filter for a coaxial line having an outer conductor and an inner conductor severed to form a gap, said filter comprising
   - first and second capacitor elements within said outer conductor, each of said elements comprising
     - a dielectric disc and a plate on each side of said disc, said plates on each disc having axially aligned portions, one of said plates on each element being electrically connected to said center conductor means for electrically interconnecting the other plates of said elements, and an inductor element comprising conductor means of predetermined length electrically connected to said other plates of the capacitor elements and to the outer conductor.

References Cited by the Examiner

UNITED STATES PATENTS

| | | | |
|---|---|---|---|
| 2,149,356 | 3/39 | Mason | 333—73 |
| 2,239,905 | 4/41 | Trevor | 333—73 |
| 2,414,115 | 1/47 | Mason | 333—73 |
| 2,811,698 | 10/57 | Slate | 333—84 |
| 2,968,772 | 1/62 | Thomas | 333—73 |

HERMAN KARL SAALBACH, *Primary Examiner.*